Figure 1:
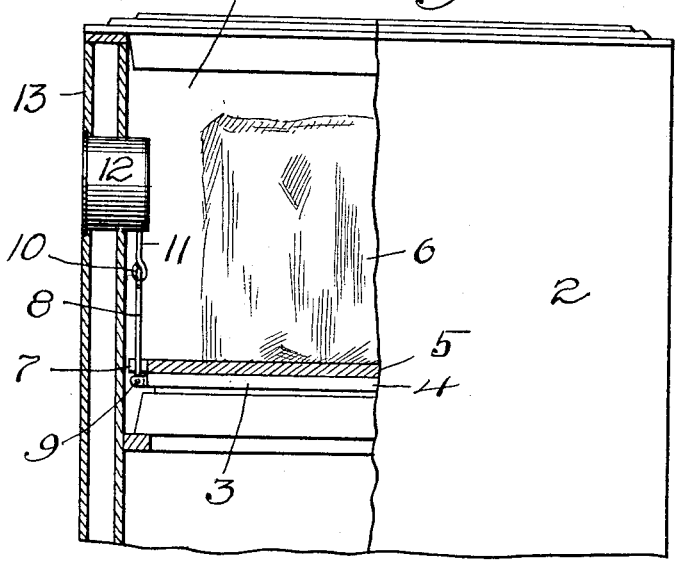

I. G. GRENINGER.
SCALE.
APPLICATION FILED JUNE 18, 1913.

1,113,615. Patented Oct. 13, 1914.

WITNESSES
Samuel Hayne
Karl H. Butler

INVENTOR
I. G. Greninger.
By Henry C. Evert
ATTORNEY

UNITED STATES PATENT OFFICE.

IRVIN G. GRENINGER, OF VANDERGRIFT, PENNSYLVANIA.

SCALE.

1,113,615.  Specification of Letters Patent.  Patented Oct. 13, 1914.

Application filed June 18, 1913. Serial No. 774,328.

*To all whom it may concern:*

Be it known that I, IRVIN G. GRENINGER, a citizen of the United States of America, residing at Vandergrift, in the county of Westmoreland and State of Pennsylvania, have invented certain new and useful Improvements in Scales, of which the following is a specification, reference being had therein to the accompanying drawing.

This invention relates to scales especially designed for refrigerators, and the object of my invention is to provide the refrigeratory compartment of a refrigerator, ice box or other structure with a scale having a dial that is exposed in one of the walls of the refrigerator, whereby the weight of the ice or refrigeratory agent placed in the refrigerator can be determined and just what amount of the ice is used daily for cooling purposes.

I attain the above and other objects by a mechanical construction that will be hereinafter specifically described and then claimed, and reference will now be had to the drawing, wherein:—

Figure 2:
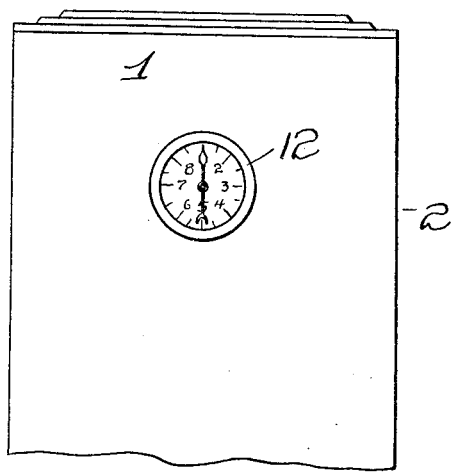

Figure 1 is an elevation of a portion of a refrigerator partly broken away and partly in section, and Fig. 2 is a similar view illustrating the dial of the scales.

To put my invention into practice, I provide the bottom of the refrigeratory compartment 1 of a refrigerator 2 with an ordinary scale base 3 having a movable platform 4. Arranged upon this platform is a porcelain plate 5 for supporting a piece of ice 6 or a suitable refrigeratory agent. The porcelain plate 5 is slotted, as at 7 to provide a clearance for a link 8 that is pivotally connected as at 9 to the movable base 3 of the scales. The link 8 is connected, as at 10 to the actuating rod 11 of a dial casing 12, said casing being mounted in the double wall 13 of the refrigerator, whereby the dial 14 of the scales will be exposed and can be easily read, to determine the weight of the piece of ice placed upon the scales.

It is thought that the utility of the scales will be apparent without further description, and while in the drawing there is illustrated a preferred embodiment of the invention, it is to be understood that the structural elements are susceptible to such variations and modifications as fall within the scope of the appended claim.

What I claim is:—

The combination with a refrigerator having a refrigeratory compartment formed therein and adapted to receive a refrigeratory agent, of a scale base located within the bottom of said compartment, a plate carried by said base and adapted to support said agent, a link connected to said base and extending up through said plate, a dial mechanism including an inclosing casing mounted in and projecting inwardly from a side wall of said refrigerator and visible from the front of said wall, and an operative connection between said mechanism and said link whereby the weight of said agent can be determined by observing said dial.

In testimony whereof I affix my signature in the presence of two witnesses.

IRVIN G. GRENINGER.

Witnesses:
R. M. STRAWN,
WM. CASPER.

Copies of this patent may be obtained for five cents each, by addressing the "Commissioner of Patents, Washington, D. C."